United States Patent
Bassias et al.

(10) Patent No.: US 9,661,025 B2
(45) Date of Patent: May 23, 2017

(54) METHOD AND APPARATUS FOR IDENTIFYING AND DETECTING THREATS TO AN ENTERPRISE OR E-COMMERCE SYSTEM

(71) Applicant: Patternex, Inc., San Jose, CA (US)

(72) Inventors: Constantinos Bassias, San Jose, CA (US); Vamsi Korrapati, San Jose, CA (US); Uday Veeramachaneni, San Jose, CA (US)

(73) Assignee: PATTERNEX, INC., San Jose, CA (US)

( * ) Notice: Subject to any disclaimer, the term of this patent is extended or adjusted under 35 U.S.C. 154(b) by 0 days.

(21) Appl. No.: 15/258,797

(22) Filed: Sep. 7, 2016

(65) Prior Publication Data

US 2016/0381077 A1    Dec. 29, 2016

Related U.S. Application Data

(63) Continuation of application No. 14/532,812, filed on Nov. 4, 2014.

(51) Int. Cl.
*H04L 29/06* (2006.01)
*G06N 5/04* (2006.01)
*G06N 7/00* (2006.01)

(52) U.S. Cl.
CPC ............ *H04L 63/20* (2013.01); *G06N 5/047* (2013.01); *G06N 7/005* (2013.01);
(Continued)

(58) Field of Classification Search
USPC ........................................................ 726/23
See application file for complete search history.

(56) References Cited

U.S. PATENT DOCUMENTS

| 8,418,249 B1 * | 4/2013 | Nucci | G06F 21/552 |
| | | | 706/20 |
| 2008/0168135 A1 * | 7/2008 | Redlich | G06Q 10/10 |
| | | | 709/204 |

(Continued)

OTHER PUBLICATIONS

Kleiner at al; "The big Data Bootstrap" (Proceedings of the 29th International Conference on Machine Learning, Edinburgh, Scotland, UK, 2012); 8 pages.*

(Continued)

*Primary Examiner* — Jason Lee
(74) *Attorney, Agent, or Firm* — Hulsey, P.C.

(57) ABSTRACT

Methods and apparatuses for identifying and detecting threats to an enterprise or e-commerce system are disclosed, including grouping log lines belonging to one or more log line parameters from one or more enterprise or e-commerce system data sources and/or from incoming data traffic to the enterprise or e-commerce system; extracting one or more features from the grouped log lines into one or more features tables; using one or more statistical models on the one or more features tables to identify statistical outliers; labeling the statistical outliers to create one or more labeled features tables; using the one or more labeled features tables to create one or more rules for identifying threats to the enterprise or e-commerce system; and using the one or more rules on incoming enterprise or e-commerce system data traffic to detect threats to the enterprise or e-commerce system. Other embodiments are described and claimed.

28 Claims, 6 Drawing Sheets

(52) U.S. Cl.
CPC ...... *H04L 63/1416* (2013.01); *H04L 63/1425* (2013.01); *G06F 2221/2101* (2013.01); *H04L 63/1441* (2013.01); *H04L 2463/102* (2013.01)

(56) References Cited

U.S. PATENT DOCUMENTS

| | | | | |
|---|---|---|---|---|
| 2008/0229415 A1* | 9/2008 | Kapoor | ................... | G06F 21/55 726/22 |
| 2012/0137367 A1* | 5/2012 | Dupont | ................... | G06F 21/00 726/25 |
| 2013/0318584 A1* | 11/2013 | Narayanan | .............. | G06F 21/50 726/7 |
| 2014/0278435 A1* | 9/2014 | Ganong, III | ............ | G10L 15/22 704/275 |

OTHER PUBLICATIONS

Kleiner, Ariel , "The Big Data Bootstrap".

* cited by examiner

METHOD AND APPARATUS FOR IDENTIFYING AND DETECTING THREATS TO AN ENTERPRISE OR E-COMMERCE SYSTEM

I. CROSS-REFERENCE TO RELATED APPLICATIONS

This application is related to: U.S. Utility patent application Ser. No. 14/532,812 filed Nov. 4, 2014.

This Application incorporates by reference: U.S. Utility patent application Ser. No. 14/532,812 filed Nov. 4, 2014.

II. BACKGROUND

The invention relates generally to the field of identifying and detecting threats to an enterprise or e-commerce system. More particularly, the invention relates to a scalable method and scalable apparatus for detecting threats by automatically creating statistical rules based on statistical outliers of one or more enterprise or e-commerce systems.

III. SUMMARY

In one respect, disclosed is a method for identifying and detecting threats to an enterprise or e-commerce system, the method comprising: grouping log lines belonging to one or more log line parameters from one or more enterprise or e-commerce system data sources and/or from incoming data traffic to the enterprise or e-commerce system; extracting one or more features from the grouped log lines into one or more features tables; using one or more statistical models on the one or more features tables to identify statistical outliers; labeling the statistical outliers to create one or more labeled features tables; and using the one or more labeled features tables to create one or more rules for identifying threats to the enterprise or e-commerce system.

In one respect, disclosed is an apparatus for identifying and detecting threats to an enterprise or e-commerce system, the apparatus comprising: one or more processors; system memory coupled to the one or more processors; one or more non-transitory memory units coupled to the one or more processors; and threat identification and detection code stored on the one or more non-transitory memory units that when executed by the one or more processors are configured to perform a method, comprising: grouping log lines belonging to one or more log line parameters from one or more enterprise or e-commerce system data sources and/or from incoming data traffic to the enterprise or e-commerce system; extracting one or more features from the grouped log lines into one or more features tables; using one or more statistical models on the one or more features tables to identify statistical outliers; labeling the statistical outliers to create one or more labeled features tables; and using the one or more labeled features tables to create one or more rules for identifying threats to the enterprise or e-commerce system.

In another respect, disclosed is an apparatus for identifying and detecting threats to an enterprise or e-commerce system, the apparatus comprising: a pattern discoverer; one or more pattern normalizers coupled to the pattern discover; and one or more threat detectors coupled to the pattern discover; wherein at least one of the one or more pattern normalizers comprise: one or more pattern normalizer processors; pattern normalizer system memory coupled to the one or more pattern normalizer processors; one or more pattern normalizer non-transitory memory units coupled to the one or more pattern normalizer processors; a pattern normalizer communications device coupled to the one or more pattern normalizer processors, the pattern normalizer communications device being configured to communicate with the pattern discover; and pattern normalizer code stored on the one or more pattern normalizer non-transitory memory units that when executed by the one or more pattern normalizer processors are configured to perform a pattern normalizer method, comprising: grouping log lines belonging to one or more log line parameters from one or more enterprise or e-commerce system data sources and/or from incoming data traffic to the enterprise or e-commerce system; extracting one or more features from the grouped log lines into one or more features tables; and sending the one or more features tables to the pattern discoverer; wherein the pattern discoverer comprises: one or more pattern discoverer processors; pattern discoverer system memory coupled to the one or more pattern discoverer processors; one or more pattern discoverer non-transitory memory units coupled to the one or more pattern discoverer processors; a pattern discoverer communications device coupled to the one or more pattern discoverer processors, the pattern discoverer communications device being configured to communicate with the one or more pattern normalizers; and pattern discoverer code stored on the one or more pattern discoverer non-transitory memory units that when executed by the one or more pattern discoverer processors are configured to perform a pattern discoverer method, comprising: using one or more statistical models on the one or more features tables to identify statistical outliers; labeling the statistical outliers to create one or more labeled features tables; using the one or more labeled features tables to create one or more rules for identifying threats to the enterprise or e-commerce system; and sending to the one or more threat detectors, the one or more rules for identifying threats to the enterprise or e-commerce system; and wherein at least one of the one or more threat detectors comprise: one or more threat detector processors; threat detector system memory coupled to the one or more threat detector processors; one or more threat detector non-transitory memory units coupled to the one or more threat detector processors; a threat detector communications device coupled to the one or more threat detector processors, the threat detector communications device being configured to communicate with the pattern discover; and threat detector code stored on the one or more threat detector non-transitory memory units that when executed by the one or more threat detector processors are configured to perform a threat detector method, comprising: using the one or more rules on the incoming data traffic to the enterprise or e-commerce system to detect threats to the enterprise or e-commerce system.

Numerous additional embodiments are also possible.

IV. BRIEF DESCRIPTION OF THE DRAWINGS

Other objects and advantages of the invention may become apparent upon reading the detailed description and upon reference to the accompanying drawings.

Figure 1:
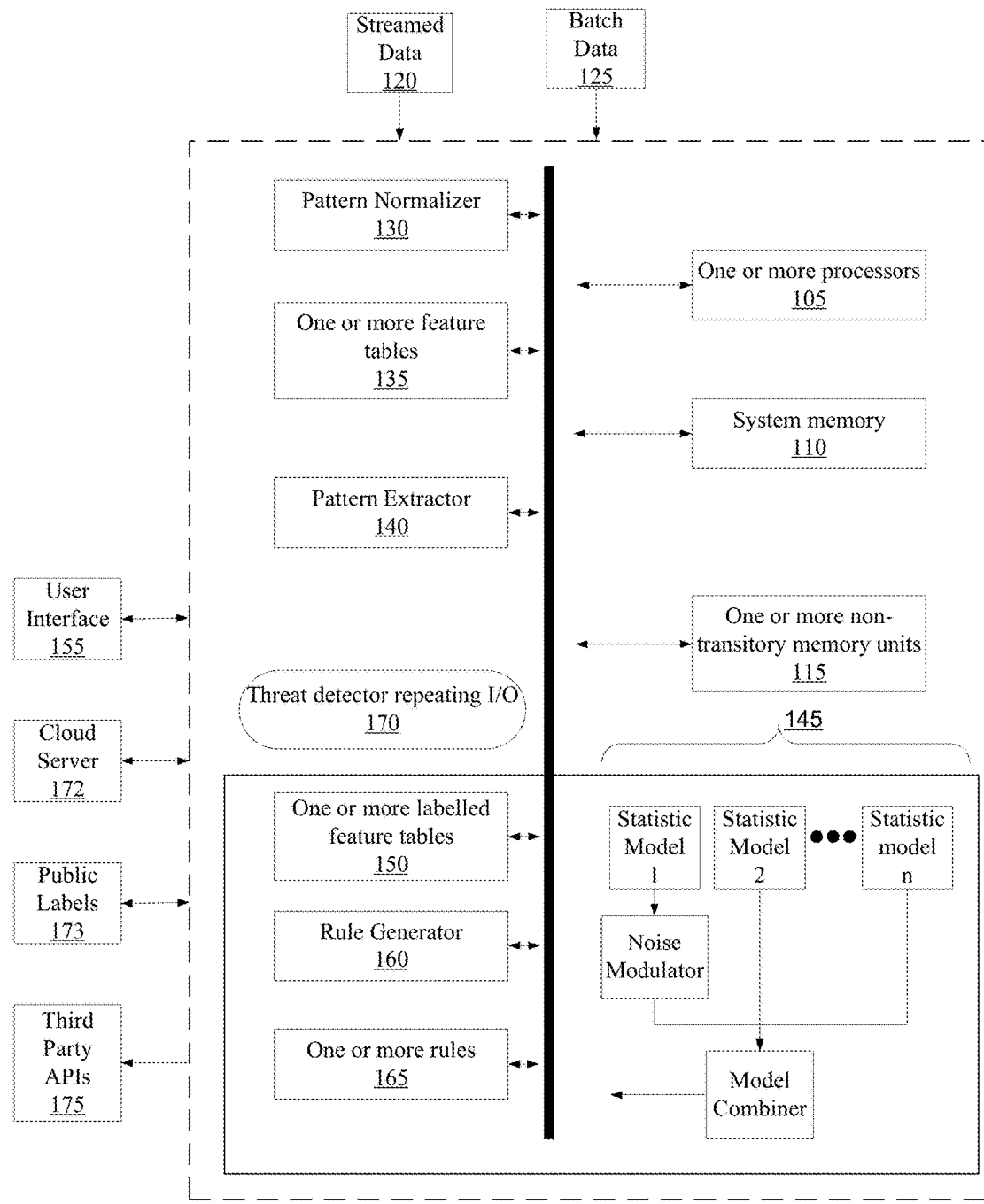
FIG. 1 is a block diagram illustrating an apparatus for identifying and detecting threats to an enterprise or e-commerce system, in accordance with some embodiments.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

V. DETAILED DESCRIPTION

One or more embodiments of the invention are described below. It should be noted that these and any other embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art.

Malicious or unauthorized use of enterprise or e-commerce systems is on the rise. The results of which can be seen in the daily reports about breach and fraud. Unfortunately, roughly 70% of these activities are discovered or detected by the end users or by third parties. This is the case since current cyber security infrastructure uses simplistic, static rules and signatures that are backward looking and therefore cannot catch what has not been seen before. Typically, information about the malicious or unauthorized use of enterprise or e-commerce systems is captured by current cyber security infrastructure, but are merely indexed and stored for search and retrieval during forensics. Once a malicious or unauthorized use is discovered and a new breach or fraud identified, new rules and signatures are implemented to the current cyber security infrastructure. Eventually though, malicious or unauthorized users are successful in bypassing the new rules and signatures and the whole process of discovery by a third party or end user, forensics by the victim, and subsequent rule creation starts again. Current cyber security infrastructure is not capable of identifying and detecting malicious or unauthorized usage that is capable of circumventing enterprise or e-commerce systems' firewalls and rules. This is leading to an increase in breach and fraud.

The embodiment or embodiments described herein solve these problems and others by proposing a new method and apparatus for identifying and detecting threats to an enterprise or e-commerce system. The new method and apparatus uses a multi-dimensional statistical analysis of multiple extracted features from one or more enterprise or e-commerce system data sources and/or from incoming data traffic to the enterprise or e-commerce system to identify outliers. These statistical outliers are where malicious or unauthorized usage may be found. One or more rules for identifying threats to the enterprise or e-commerce system are then created based on the labeling of the statistical outliers. The one or more rules may then be used in the real-time detection of malicious or unauthorized use of the enterprise or e-commerce system.

FIG. 1 is a block diagram illustrating an apparatus for identifying and detecting threats to an enterprise or e-commerce system, in accordance with some embodiments.

In some embodiments, apparatus 100 comprises one or more processors 105, system memory 110, and one or more non-transitory memory units 115, all of which are directly or indirectly coupled to each other. Streamed data 120 and/or batch data 125 is fed into the apparatus 100 where a pattern normalizer 130 which comprises code stored on the one or more non-transitory memory units that when executed by the one or more processors are configured to parse the streamed data 120 and/or batch data 125 by grouping or bunching log lines belonging to one or more log line parameters and then extracting one or more features from the grouped log lines into one or more features tables 135. The streamed data 120 comprises incoming data traffic to an enterprise or e-commerce system. The batch data 125 comprises web server access logs, firewall logs, packet captures per application, active directory logs, DNS logs, forward proxy logs, external threat feeds, AV logs, user logon audits, DLP logs, LB logs, IPS/IDS logs, black listed URLs, black listed IP addresses, and black listed referrers. The one or more log line parameters comprises at least one of: user ID, session, IP address, and URL query. The features of a features table, organized or grouped by sessions, comprises at least one of: user session duration, number of requests in user session, average time between clicks in user session, user session click rate, percentage of image requests in user session, percentage of 4xx responses in user session, percentage of 3xx responses in user session, percentage of 2xx responses in user session, percentage of zip responses in user session, percentage of binary responses in user session, and percentage of head requests in user session. The features of a features table, organized or grouped by URL queries, comprises at least one of: length of user URL query, number of characters of user URL query, number of digits of user URL query, and number of punctuations of user URL query. The features of a features table, organized or grouped by user ID, comprises at least one of: number of checkouts, number of credit cards added, number of promo codes added, number of gift cards added, number of times items were shipped overnight, and number of times new shipping address was added. The features of a features table, organized or grouped by IP address, comprises at least one of: number of login failures, number of login successes, number of password resets, and total number of requests. In some embodiments, the one or more features tables comprise a matrix where the features are arranged by column and the one or more log line parameters make up the rows. The one or more features tables 135 are then sent to a pattern extractor 140 where the pattern extractor 140 which comprises code stored on the one or more non-transitory memory units that when executed by the one or more processors are configured to use one or more statistical models 145, such as Clustering models, Hidden Markov model, and Copula models, on the one or more features tables 135 to identify statistical outliers. Some embodiments may employ noise modulation of statistical mode prior to combination of the statistical models via model combiner. In the embodiment where the pattern extractor 140 uses the Copula models on the one or more features tables 135, the pattern extractor 140 applies a Copula function on all the features of the one or more features tables 135. The Copula function comprises using various techniques to estimate a cumulative distribution function for each feature. In one embodiment, a kernel density estimation function is used to estimate the cumulative distribution function. Next, the cumulative distribution function for each feature is used to calculate a U-matrix. The inverse of the U-matrix is then normalized and a RHOHAT computed. The RHOHAT and U-matrix are then used to compute the joint probability distribution of each row of a feature table. In some embodiments, the one or more log line parameters of the one or more features tables 135 are ranked and rearranged by probability by the pattern extractor 140.

The statistical outliers are then labeled as malicious, non-malicious, or other administrator defined label in order to create one or more labeled features tables 150. In some embodiments, the statistical outliers are presented onto a user interface 155 so that an administrator of the enterprise or e-commerce system may manually identify the statistical outliers as malicious, non-malicious, or other administrator defined label. The one or more labeled features tables 150 are then sent to a rule generator 160 where the rule generator 160 which comprises code stored on the one or more non-transitory memory units that when executed by the one or more processors are configured to create from the one or more labeled features tables one or more rules 165 for identifying threats to the enterprise or e-commerce system. The one or more rules 165 comprises a random forest classifier, learning vector quantization, and/or a neural network. The one or more rules 165 that are created are essentially behavioral rules based on a multi-dimensional view of the incoming streamed data 120 and/or batch data 125. The one or more rules 165 may then be sent to one or more threat detectors 170 for real-time monitoring of the streamed data 120. The one or more rules 165 may also be posted to a cloud server 172 or distributed to other third parties 175 to be used in their firewall rules set. In some embodiments, public labelling data 173 may be input into system rules. In some embodiments, labelling of statistical threats may be made publicly available. If threats are not detected by the one or more threat detectors 170, the incoming data traffic is allowed to continue to the enterprise or e-commerce system. If threats are detected by the one or more threat detectors 170, the incoming data traffic to the enterprise or e-commerce system may be blocked and/or challenged. In some embodiments, if a threat is detected, the detected threat may be used to modify the one or more statistical models 145 used by the pattern extractor 140 and/or to modify the one or more rules 165 generated by the rule generator 160.

In some embodiments, the pattern extractor 140 may be fully distributed across multiple server class machines in order to scale the processing of a large number, i.e. billions, of rows of log line parameters. To scale across the features of the one or more features tables 135, each node of the multiple server class machines performs all the one or more statistical models on a group of features and a master node of the multiple server class machines aggregates the results from all the nodes of the multiple server class machines. To scale across the rows of one or more log line parameters of the one or more features tables 135, the pattern extractor 140 may intelligently sample the rows of one or more log line parameters by using a technique called bag of little bootstraps. The bag of little bootstraps functions by averaging the results of bootstrapping multiple small subsets of log line parameters.

Figure 2:
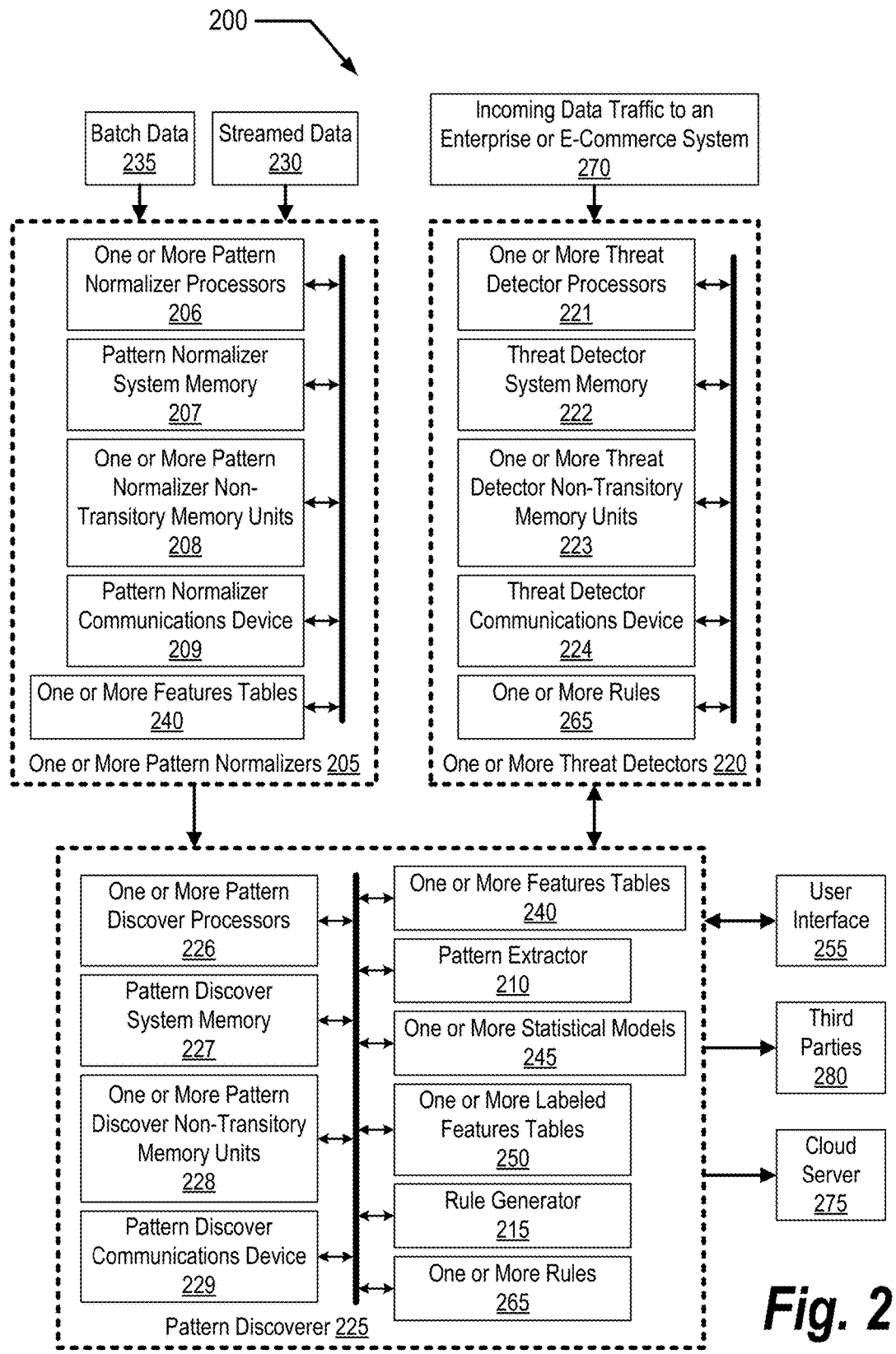
FIG. 2 is a block diagram illustrating an apparatus for identifying and detecting threats to an enterprise or e-commerce system, in accordance with some embodiments.

FIG. 2 is a block diagram illustrating an apparatus for identifying and detecting threats to an enterprise or e-commerce system, in accordance with some embodiments.

In some embodiments, apparatus 200 comprises one or more pattern normalizers 205, a pattern extractor 210, a rule generator 215, and one or more threat detectors 220 separated over one or more computing systems. In one embodiment, the pattern extractor 210 and the rule generator 215 are integrated together as a pattern discoverer 225 onto a single computing system. In the embodiment illustrated in FIG. 2, at least one of the one or more pattern normalizers 205 comprise one or more pattern normalizer processors 206, pattern normalizer system memory 207, one or more pattern normalizer non-transitory memory units 208, and a pattern normalizer communications device 209, all of which are directly or indirectly coupled to each other, and pattern normalizer code stored on the one or more pattern normalizer non-transitory memory units that when executed by the one or more pattern normalizer processors are configured to perform a pattern normalizer method. The pattern discoverer 225 comprises one or more pattern discoverer processors 226, pattern discoverer system memory 227, one or more pattern discoverer non-transitory memory units 228, and a pattern discoverer communications device 229, all of which are directly or indirectly coupled to each other, and pattern discoverer code stored on the one or more pattern discoverer non-transitory memory units that when executed by the one or more pattern discoverer processors are configured to perform a pattern discoverer method. The at least one of the one or more threat detectors 220 comprise one or more threat detector processors 221, threat detector system memory 222, one or more threat detector non-transitory memory units 223, and a threat detector communications device 224, all of which are directly or indirectly coupled to each other, and threat detector code stored on the one or more threat detector non-transitory memory units that when executed by the one or more threat detector processors are configured to perform a threat detector method. In apparatus 200, streamed data 230 and/or batch data 235 is fed into the one or more pattern normalizers 205. The one or more pattern normalizers 205 parse the streamed data 230 and/or batch data 235 by grouping or bunching log lines belonging to one or more log line parameters and extracting one or more features from the grouped log lines into one or more features tables 240. The streamed data 230 comprises incoming data traffic to an enterprise of e-commerce system. The batch data 235 comprises web server access logs, firewall logs, packet captures per application, active directory logs, DNS logs, forward proxy logs, external threat feeds, AV logs, user logon audits, DLP logs, LB logs, IPS/IDS logs, black listed URLs, black listed IP addresses, and black listed referrers. The one or more log line parameters comprises at least one of: user ID, session, IP address, and URL query. The features of a features table 240, organized or grouped by sessions, comprises at least one of: user session duration, number of requests in user session, average time between clicks in user session, user session click rate, percentage of image requests in user session, percentage of 4xx responses in user session, percentage of 3xx responses in user session, percentage of 2xx responses in user session, percentage of zip responses in user session, percentage of binary responses in user session, and percentage of head requests in user session. The features of a features table 240, organized or grouped by URL queries, comprises at least one of: length of user URL query, number of characters of user URL query, number of digits of user URL query, and number of punctuations of user URL query. The features of a features table 240, organized or grouped by user ID, comprises at least one of: number of checkouts, number of credit cards added, number of promo codes added, number of gift cards added, number of times items were shipped overnight, and number of times new shipping address was added. The features of a features table 240, organized or grouped by IP address, comprises at least one of: number of login failures, number of login successes, number of password resets, and total number of requests. In some embodiments, the one or more features tables 240 comprise a matrix where the features are arranged by column and the one or more log line parameters make up the rows. The one or more features tables 240 are then sent to the pattern discoverer 225, where the pattern extractor 210 uses one or more statistical models 245, such as Clustering models, Hidden Markov model, and Copula models, on the one or more features tables 240 to identify statistical outliers. In the embodiment where the pattern extractor 210 uses the Copula models on the one or more features tables 240, the pattern extractor 210 applies a Copula function on all the features of the one or more features tables 240. The Copula function comprises using various techniques to estimate a cumulative distribution function for each feature. In one embodiment, a kernel density estimation function is used to estimate the cumulative distribution function. Next, the cumulative distribution function of each feature is used to calculate a U-matrix. The inverse of the U-matrix is then normalized and a RHOHAT computed. The pattern extractor 210 then uses the RHOHAT and U-matrix to compute joint probability distributions of each row of a feature table. In some embodiments, the one or more log line parameters of the one or more features tables 240 are ranked and rearranged by probability by the pattern extractor 210.

The statistical outliers are then labeled as malicious, non-malicious, or other administrator defined label in order to create one or more labeled features tables 250. In some embodiments, the statistical outliers are presented onto a user interface 255 so that an administrator of the enterprise or e-commerce system may manually identify the statistical outliers as malicious, non-malicious, or other administrator defined label. The one or more labeled features tables 250 are then sent to the rule generator 215 which comprises code stored on the one or more pattern discover non-transitory memory units that when executed by the one or more pattern discoverer processors are configured to create from the one or more labeled features tables one or more rules 265 for identifying threats to the enterprise or e-commerce system. The one or more rules 265 comprises a random forest classifier, learning vector quantization, and/or a neural network. The one or more rules 265 that are created are essentially behavioral rules based on a multi-dimensional view of the incoming streamed data 230 and/or batch data 235. The one or more rules 265 may then be sent to one or more threat detectors 220 for real-time monitoring of incoming data traffic to an enterprise or e-commerce system 270. The one or more rules 265 may also be posted to a cloud server 275 or distributed to other third parties 280 to be used in their firewall rules set. If threats are not detected by the one or more threat detectors 220, the incoming data traffic 270 is allowed to continue to the enterprise or e-commerce system. If threats are detected by the one or more threat detectors 220, the incoming data traffic to the enterprise or e-commerce system 270 may be blocked and/or challenged. In some embodiments, if a threat is detected, the detected threat may be used to modify the one or more statistical models 245 used by the pattern extractor 210 and/or to modify the one or more rules 265 generated by the rule generator 215.

In some embodiments, the pattern discoverer 225 may be fully distributed across multiple server class machines in order to scale the processing of a large number, i.e. billions, of rows of log line parameters. To scale across the features of the one or more features tables 240, each node of the multiple server class machines performs all the one or more statistical models on a group of features and a master node of the multiple server class machines aggregates the results from all the nodes of the multiple server class machines. To scale across the rows of one or more log line parameters of the one or more features tables 240, the pattern extractor 210 may intelligently sample the rows of one or more log line parameters by using a technique called bag of little bootstraps. The bag of little bootstraps functions by averaging the results of bootstrapping multiple small subsets of log line parameters.

Figure 3:
FIG. 3 is a table showing a features table, in accordance with some embodiments.

FIG. 3 is a table showing a features table, in accordance with some embodiments.

In some embodiments, a pattern normalizer parses streamed data and/or batch data by grouping or bunching log lines belonging to one or more log line parameters and then extracting features from the one or more log line parameters into one or more features tables. The streamed data comprises incoming data traffic to an enterprise or e-commerce system. The batch data comprises web server access logs, firewall logs, packet captures per application, active directory logs, DNS logs, forward proxy logs, external threat feeds, AV logs, user logon audits, DLP logs, LB logs, IPS/IDS logs, black listed URLs, black listed IP addresses, and black listed referrers. The one or more log line parameters comprises at least one of: user ID, session, IP address, and URL query. The one or more features tables may be created at one day, seven day, and/or thirty day periods. The features table 300, organized or grouped by session from Session 1 to Session n, comprises one or more columns of session features, Features 1 to Features m, comprising at least one of: user session duration, number of requests in user session, average time between clicks in user session, user session click rate, percentage of image requests in user session, percentage of 4xx responses in user session, percentage of 3xx responses in user session, percentage of 2xx responses in user session, percentage of zip responses in user session, percentage of binary responses in user session, and percentage of head requests in user session. The features of a features table, organized or grouped by URL queries, comprises at least one of: length of user URL query, number of characters of user URL query, number of digits of user URL query, and number of punctuations of user URL query. The features of a features table, organized or grouped by user ID, comprises at least one of: number of checkouts, number of credit cards added, number of promo codes added, number of gift cards added, number of times items were shipped overnight, and number of times new shipping address was added. The features of a features table, organized or grouped by IP address, comprises at least one of: number of login failures, number of login successes, number of password resets, and total number of requests.

Figure 4:
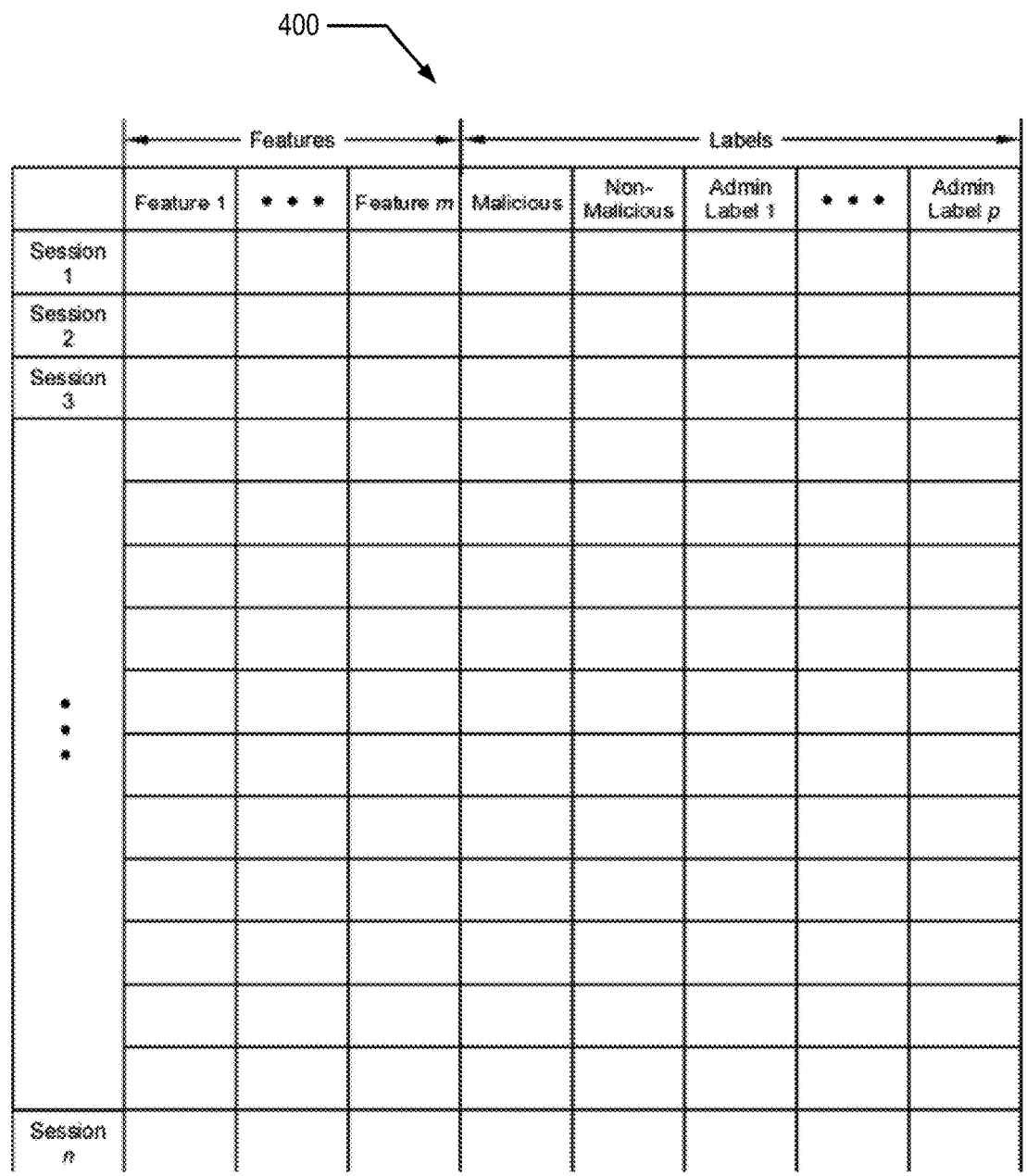
FIG. 4 is a table showing a labeled features table, in accordance with some embodiments.

FIG. 4 is a table showing a labeled features table, in accordance with some embodiments.

In some embodiments, a pattern extractor uses one or more statistical models, such as Clustering models, Hidden Markov model, and Copula models, on the features table of FIG. 3 to identify statistical outliers. The statistical outliers are then labeled as malicious, non-malicious, or other administrator defined label in order to create a labeled features table 400. The labeled features table 400, organized or grouped by session from Session 1 to Session n, comprises one or more columns of session features, Features 1 to Features m, and one or more columns of labels for the sessions. In labeled features table 400, there is a Malicious label, a Non-Malicious label, and Administrator Label 1 to Administrator Label p. Other similar labeled features tables may be created for user ID, IP address, and URL query.

Figure 5:
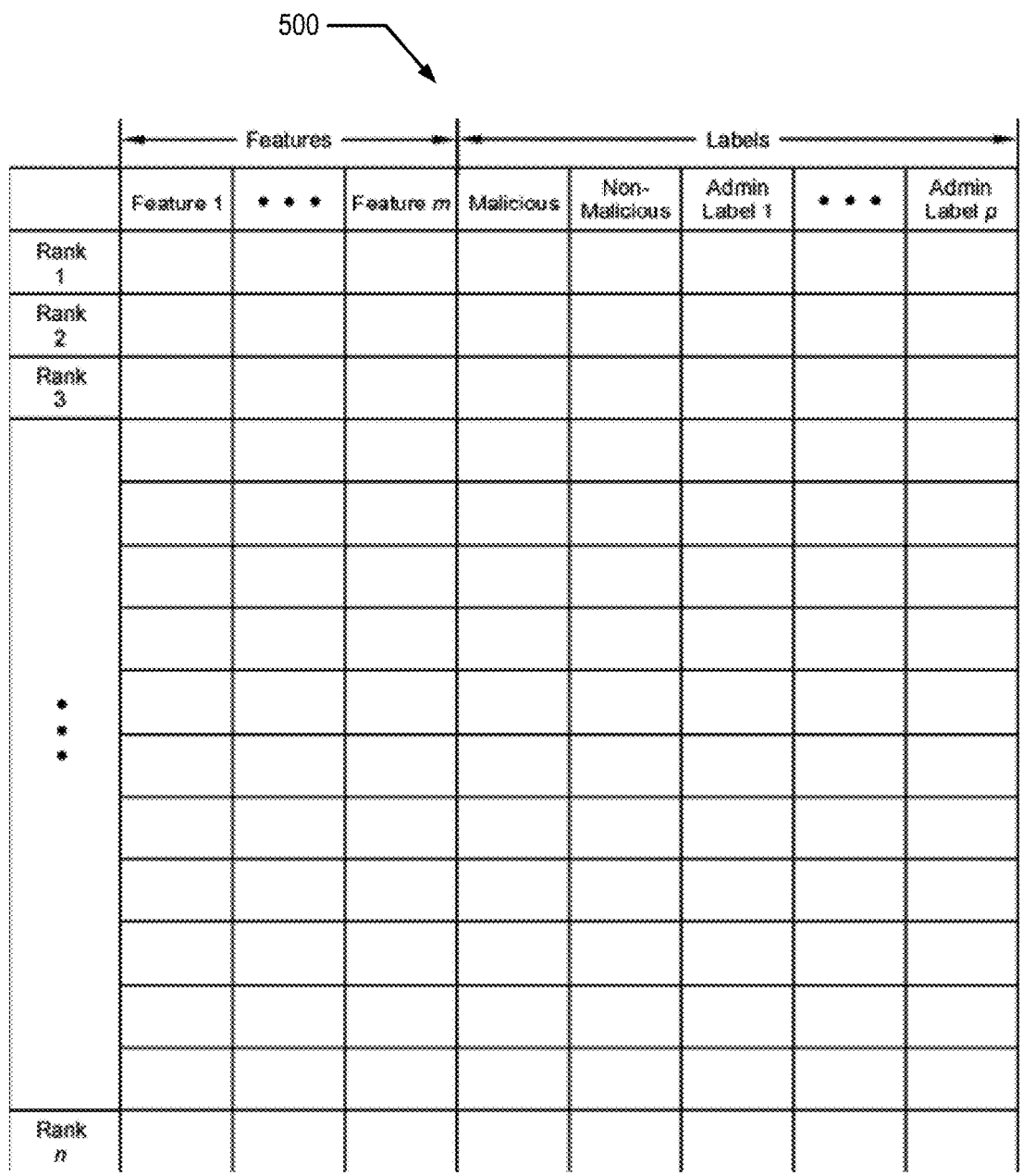
FIG. 5 is a table showing a ranked/labeled features table, in accordance with some embodiments.

FIG. 5 is a table showing a ranked/labeled features table, in accordance with some embodiments.

In some embodiments, a pattern extractor uses one or more statistical models, such as Clustering models, Hidden Markov model, and Copula models, on the features table of FIG. 3 to identify statistical outliers. The pattern extractor then ranks and rearranges by probability each of the one or more log line parameters from Rank 1 to Rank n, with Rank 1 being the least likely log line parameter to Rank n being the most likely log line parameter. Millions of log lines may be rearranged and ranked. The statistical outliers are then labeled as malicious, non-malicious, or other administrator defined label to create a ranked/labeled features table 500.

Figure 6:
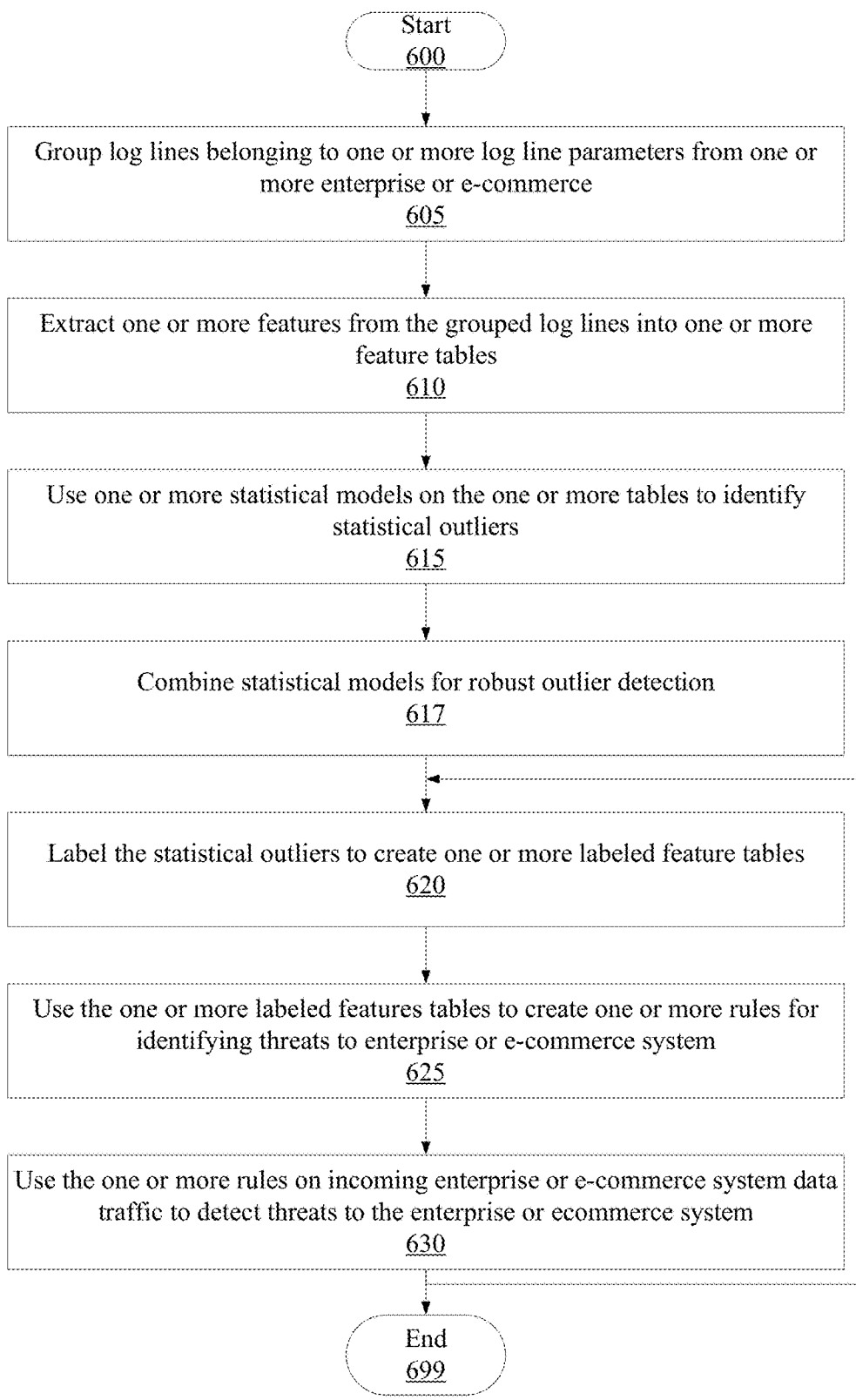
FIG. 6 is a block diagram illustrating a method for identifying and detecting threats to an enterprise or e-commerce system, in accordance with some embodiments.

FIG. 6 is a block diagram illustrating a method for identifying and detecting threats to an enterprise or e-commerce system, in accordance with some embodiments.

In some embodiments, the method illustrated for identifying and detecting threats to an enterprise or e-commerce system in FIG. 6 may be performed by one or more of the apparatuses and feature tables illustrated in FIG. 1, FIG. 2, FIG. 3, FIG. 4, and FIG. 5. Processing begins at 600 whereupon, at block 605, log lines belonging to one or more log line parameters are grouped from one or more enterprise or e-commerce system data sources and/or from incoming data traffic to the enterprise or e-commerce system. The one or more enterprise or e-commerce system data sources comprises at least one of: web server access logs, firewall logs, packet captures per application, active directory logs, DNS logs, forward proxy logs, external threat feeds, AV logs, user logon audits, DLP logs, LB logs, IPS/IDS logs, black listed URLs, black listed IP addresses, and black listed referrers. The one or more log line parameters comprises at least one of: user ID, session, IP address, and URL query.

At block 610, one or more features are extracted from the grouped log lines into one or more features tables. The features of a features table organized or grouped by sessions, comprises at least one of: user session duration, number of requests in user session, average time between clicks in user session, user session click rate, percentage of image requests in user session, percentage of 4xx responses in user session, percentage of 3xx responses in user session, percentage of 2xx responses in user session, percentage of zip responses in user session, percentage of binary responses in user session, and percentage of head requests in user session. The features of a features table, organized or grouped by URL queries, comprises at least one of: length of user URL query, number of characters of user URL query, number of digits of user URL query, and number of punctuations of user URL query. The features of a features table, organized or grouped by user ID, comprises at least one of: number of checkouts, number of credit cards added, number of promo codes added, number of gift cards added, number of times items were shipped overnight, and number of times new shipping address was added. The features of a features table, organized or grouped by IP address, comprises at least one of: number of login failures, number of login successes, number of password resets, and total number of requests.

At block 615, one or more statistical models are used on the one or more features tables to identify statistical outliers. The one or more statistical models comprises at least one of: Clustering models, Hidden Markov model, and Copula models. In the embodiment where a Copula model is used, a Copula function is applied on all the one or more extracted features. The Copula function comprises using various techniques to estimate a cumulative distribution function for each feature. In one embodiment, a kernel density estimation function is used to estimate the cumulative distribution function. Next, the cumulative distribution function of each feature is used to calculate a U-matrix. The inverse of the U-matrix is then normalized and a RHOHAT computed. The RHOHAT and U-matrix are then used to compute the joint probability distribution of each row of a feature table. In some embodiments, the one or more log line parameters of the one or more features tables are ranked and rearranged by probability. In some embodiments, using one or more statistical models on the one or more features tables from the one or more enterprise or e-commerce system data sources to identify statistical outliers comprises: distributing one or more features from the one or more features tables across two or more servers; using the one or more statistical models on the distributed one or more features; and aggregating results from the using the one or more statistical models on the distributed one or more features. In some embodiments, the one or more statistical models may be combined 617 prior to labelling of the statistical outliers.

At block 620, the statistical outliers are labeled to create one or more labeled features tables. In some embodiments, the labeling of the statistical outliers comprises presenting an administrator the statistical outliers for identification as malicious, non-malicious, or other administrator defined label.

At block 625, the one or more labeled features tables are used to create one or more rules for identifying threats to the enterprise or e-commerce system. In some embodiments, the one or more rules for identifying threats to the enterprise or e-commerce system comprises a random forest classifier, learning vector quantization, and/or a neural network.

At block 630, the one or more rules are used on incoming enterprise or e-commerce system data traffic to detect threats to the enterprise or e-commerce system. In some embodiments, the threat detection is done in real-time. If threats are detected, the incoming data traffic to the enterprise or e-commerce system may be blocked and/or challenged. In some embodiments, if a threat is detected, the detected threat may be used to modify the one or more statistical models and/or to modify the one or more rules. Processing subsequently ends at 699.

Some embodiments described herein relate to a computer storage product with one or more non-transitory memory units having instructions or computer code thereon for performing various computer-implemented operations. The one or more memory units are non-transitory in the sense that they do not include transitory propagating signals per se (e.g., a propagating electromagnetic wave carrying information on a transmission medium such as space or a cable). The one or more memory units and computer code (also can be referred to as code) may be those designed and constructed for the specific purpose or purposes. Examples of one or more memory units include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM), and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, Python, C, or other programming languages (e.g., object-oriented programming languages) and development tools. Additional examples of computer code include, but are not limited to, control signals, encrypted code, database code, and compressed code. Embodiments of distributed database code may be implemented using Hadoop/HDFS, Cassandra, or other database technologies.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A method for identifying and detecting threats to an enterprise or e-commerce system, the method comprising:
    grouping log lines belonging to one or more log line parameters from one or more enterprise or e-commerce system data sources and/or from incoming data traffic to the enterprise or e-commerce system;
    extracting one or more features from the grouped log lines into one or more features tables;
    using one or more statistical models on the one or more features tables to identify statistical outliers;
    labeling, in response to received instructions, the statistical outliers to create one or more labeled features tables; and
    using the one or more labeled features tables to create one or more rules for performing at least one of:
    further modifying statistical models for identification of statistical outliers;
    preventing access by various threats to the enterprise or e-commerce system and
    detecting threats to the enterprise or e-commerce system in real-time.

2. The method of claim 1, wherein the method further comprises ranking and rearranging the one or more log line parameters of the one or more features tables by probability.

3. The method of claim 1, the method further comprising using the one or more adaptive rules on the incoming data traffic to the enterprise or e-commerce system to detect threats to the enterprise or e-commerce system.

4. The method of claim 2, the method further comprising using the detected threats to modify the one or more statistical models and/or the one or more rules for identifying threats to the enterprise or e-commerce system.

5. The method of claim 2, the method further comprising blocking and/or challenging the packet flow of the detected threats.

6. The method of claim 1, wherein the one or more log line parameters comprises at least one of: user ID, session, IP address, and Uniform Resource Locator (URL) query.

7. The method of claim 1, wherein the one or more enterprise or e-commerce system data sources comprises at least one of: web server access logs, firewall logs, packet captures per application, active directory logs, Domain Name System (DNS) logs, forward proxy logs, external threat feeds, AV logs, user logon audits, data loss prevention (DLP) logs, load balancer (LB) logs, intrusion prevent system (IPS)/intrusion detection system (IDS) logs, black listed URLs, black listed IP addresses, and black listed referrers.

8. The method of claim 1, wherein the one or more features comprises at least one of: user session duration, length of user URL query, number of characters of user URL query, number of digits of user URL query, number of punctuations of user URL query, number of requests in user session, average time between clicks in user session, user session click rate, percentage of image requests in user session, percentage of 4xx responses in user session, percentage of 3xx responses in user session, percentage of 2xx responses in user session, percentage of zip responses in user session, percentage of binary responses in user session, percentage of head requests in user session, number of checkouts, number of credit cards added, number of promo codes added, number of gift cards added, number of times items were shipped overnight, number of times new shipping address was added, number of login failures, number of login successes, number of password resets, and total number of requests.

9. The method of claim 1, wherein the one or more statistical models comprises at least one of: Clustering models, Hidden Markov model, and Copula models.

10. The method of claim 1, wherein the one or more rules for identifying threats to the enterprise or e-commerce system comprises a random forest classifier, learning vector quantization, and/or a neural network.

11. The method of claim 1, wherein the using one or more statistical models on the one or more features comprises using a bag of little bootstraps sampling.

12. The method of claim 1, wherein the using one or more statistical models on the one or more features tables to identify statistical outliers comprises:
    distributing one or more features from the one or more features tables across two or more servers;
    using the one or more statistical models on the distributed one or more features; and
    aggregating results from the using the one or more statistical models on the distributed one or more features.

13. The method of claim 12, wherein the using the one or more statistical models on the distributed one or more features comprises using a bag of little bootstraps sampling.

14. The method of claim 1, wherein the labeling the statistical outliers to create one or more labeled features tables comprises presenting an administrator the statistical outliers for identification as malicious, non-malicious, or other administrator defined label.

15. An apparatus for identifying and detecting threats to an enterprise or e-commerce system, the apparatus comprising:
- one or more hardware processors;
- system memory coupled to the one or more hardware processors;
- one or more non-transitory memory units coupled to the one or more hardware processors; and
- threat identification and detection code stored on the one or more non-transitory memory units that when executed by the one or more hardware processors are configured to perform a method, comprising:
  - grouping log lines belonging to one or more log line parameters from one or more enterprise or e-commerce system data sources and/or from incoming data traffic to the enterprise or e-commerce system;
  - extracting one or more features from the grouped log lines into one or more features tables;
  - using one or more statistical models on the one or more features tables to identify statistical outliers;
  - labeling, in response to received instructions, the statistical outliers to create one or more labeled features tables; and
  - using the one or more labeled features tables to create one or more rules for performing at least one of:
    - further modifying statistical models for identification of statistical outliers;
    - preventing access by various threats to the enterprise or e-commerce system and
    - detecting threats to the enterprise or e-commerce system in real-time.

16. The apparatus of claim 15, wherein the method further comprises ranking and rearranging the one or more log line parameters of the one or more features tables by probability.

17. The apparatus of claim 15, wherein the method further comprises using the one or more rules on the incoming data traffic to the enterprise or e-commerce system to detect threats to the enterprise or e-commerce system.

18. The apparatus of claim 16, wherein the method further comprises using the detected threats to modify the one or more statistical models and/or the one or more rules for identifying threats to the enterprise or e-commerce system.

19. The apparatus of claim 16, wherein the method further comprises blocking and/or challenging the packet flow of the detected threats.

20. The apparatus of claim 15, wherein the one or more log line parameters comprises at least one of: user ID, session, IP address, and Uniform Resource Locator (URL) query.

21. The apparatus of claim 15, wherein the one or more enterprise or e-commerce system data sources comprises at least one of: web server access logs, firewall logs, packet captures per application, active directory logs, Domain Name System (DNS) logs, forward proxy logs, external threat feeds, AV logs, user logon audits, data loss prevention (DLP) logs, load balancer (LB) logs, intrusion prevent system (IPS)/intrusion detection system (IDS) logs, black listed URLs, black listed IP addresses, and black listed referrers.

22. The apparatus of claim 15, wherein the one or more features comprises at least one of: user session duration, length of user URL query, number of characters of user URL query, number of digits of user URL query, number of punctuations of user URL query, number of requests in user session, average time between clicks in user session, user session click rate, percentage of image requests in user session, percentage of 4xx responses in user session, percentage of 3xx responses in user session, percentage of 2xx responses in user session, percentage of zip responses in user session, percentage of binary responses in user session, percentage of head requests in user session, number of checkouts, number of credit cards added, number of promo codes added, number of gift cards added, number of times items were shipped overnight, number of times new shipping address was added, number of login failures, number of login successes, number of password resets, and total number of requests.

23. The apparatus of claim 15, wherein the one or more statistical models comprises at least one of: Clustering models, Hidden Markov model, and Copula models.

24. The apparatus of claim 15, wherein the one or more rules for identifying threats to the enterprise or e-commerce system comprises a random forest classifier, learning vector quantization, and/or a neural network.

25. The apparatus of claim 15, wherein the using one or more statistical models on the one or more features comprises using a bag of little bootstraps sampling.

26. The apparatus of claim 15, wherein the using one or more statistical models on the one or more features tables to identify statistical outliers comprises:
- distributing one or more features from the one or more features tables across two or more servers;
- using the one or more statistical models on the distributed one or more features; and
- aggregating results from the using the one or more statistical models on the distributed one or more features.

27. The apparatus of claim 26, wherein the using the one or more statistical models on the distributed one or more features comprises using a bag of little bootstraps sampling.

28. The apparatus of claim 15, wherein the labeling the statistical outliers to create one or more labeled features tables comprises presenting an administrator the statistical outliers for identification as malicious, non-malicious, or other administrator defined label.

* * * * *